United States Patent [19]

Horiguchi

[11] Patent Number: 5,144,610

[45] Date of Patent: Sep. 1, 1992

[54] METHOD OF RECORDING DATA ON OPTICAL CARD BY PERFORMING BLANK CHECKING WITHOUT SCANNING AN ENTIRE TRACK

[75] Inventor: Toshio Horiguchi, Tokyo, Japan

[73] Assignee: Olympus Optical Co., Ltd, Tokyo, Japan

[21] Appl. No.: 654,686

[22] Filed: Feb. 13, 1991

[30] Foreign Application Priority Data

Feb. 16, 1990 [JP] Japan .................................. 2-33990

[51] Int. Cl.⁵ .............................................. G11B 3/90
[52] U.S. Cl. ..................................... 369/58; 369/116;
369/32; 369/44.28; 360/2; 235/454
[58] Field of Search ....................... 360/2; 369/100, 53,
369/54, 58, 59, 14, 15, 116, 32, 44.26, 44.28, 47;
235/454, 470, 487, 494

[56] References Cited

U.S. PATENT DOCUMENTS

| | | | |
|---|---|---|---|
| 4,841,498 | 9/1989 | Sugimura et al. | 369/58 |
| 4,847,708 | 7/1989 | Furuyama | 369/54 |
| 4,872,154 | 10/1989 | Sakagami et al. | 369/54 |
| 4,885,458 | 12/1989 | Horiguchi et al. | 235/454 |
| 4,894,817 | 1/1990 | Tanka et al. | 369/58 |
| 4,901,301 | 2/1990 | Senshu | 369/54 |
| 4,958,339 | 9/1990 | Koyama et al. | 235/454 |
| 5,027,339 | 6/1991 | Yoda et al. | 369/58 |

Primary Examiner—Roy N. Envall, Jr.
Assistant Examiner—Thai Tran
Attorney, Agent, or Firm—Stevens, Davis, Miller & Mosher

[57] ABSTRACT

In a method of recording data into a desired sector of a desired track on an optical card which includes a plurality of parallel tracks extending a track direction, each track comprising an ID portion in which track address is recorded and a data portion which is divided into a plurality of sectors, after accessing to the desired track, the track is first scanned in a forward direction in the track direction to find whether the desired sector is actually blank or not, and as soon as the relevant sector is checked to be vacant, the movement of the optical card is stopped and the optical card is moved in a backward direction in the track direction. Then, the optical card is moved again in the forward direction and the light beam is changed into a recording high power and is modulated in accordance with the data to be recorded when the light beam comes at a start point of the desired sector. In this manner, the data can be recorded into the desired sector within a short time.

13 Claims, 3 Drawing Sheets

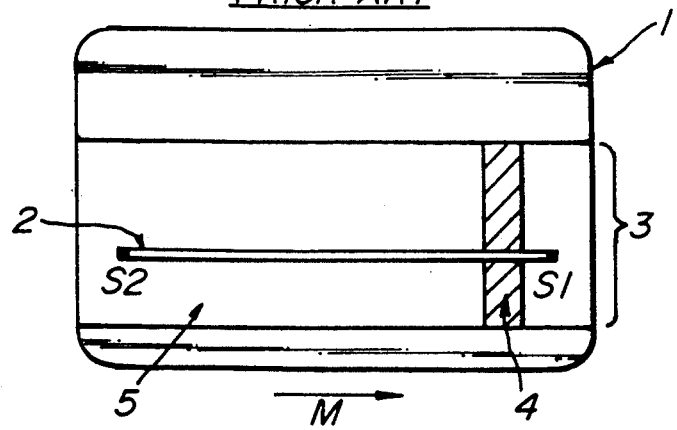
FIG_1
*PRIOR ART*
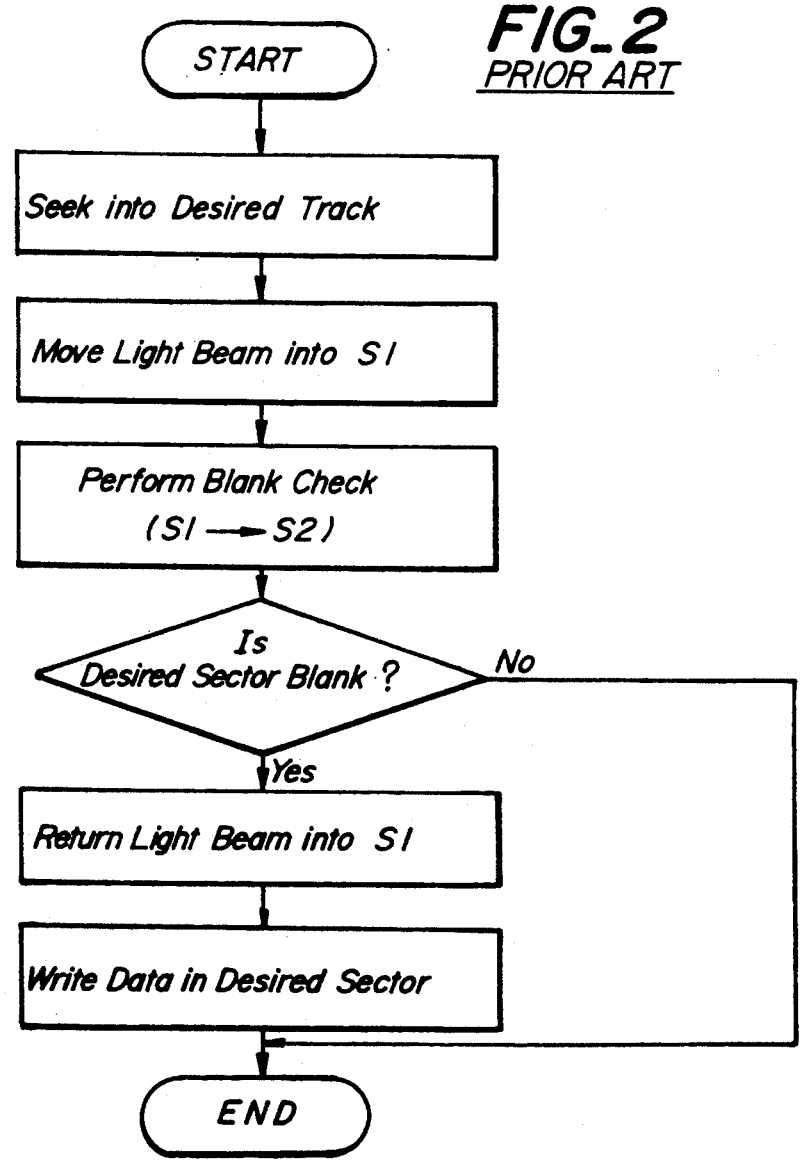
FIG_2
*PRIOR ART*

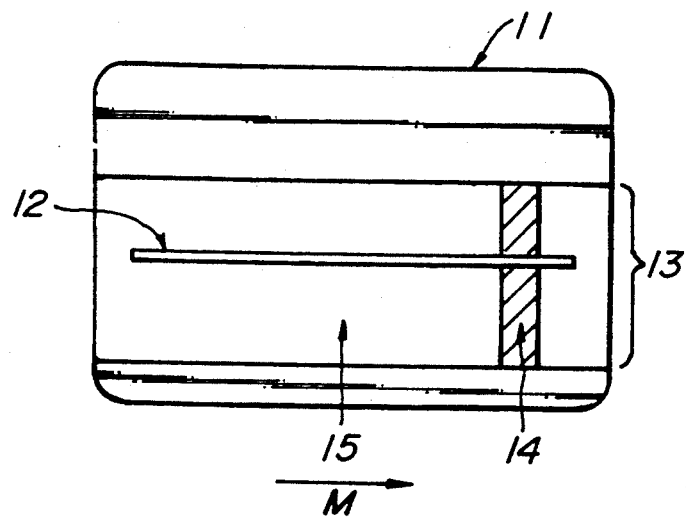
FIG_3
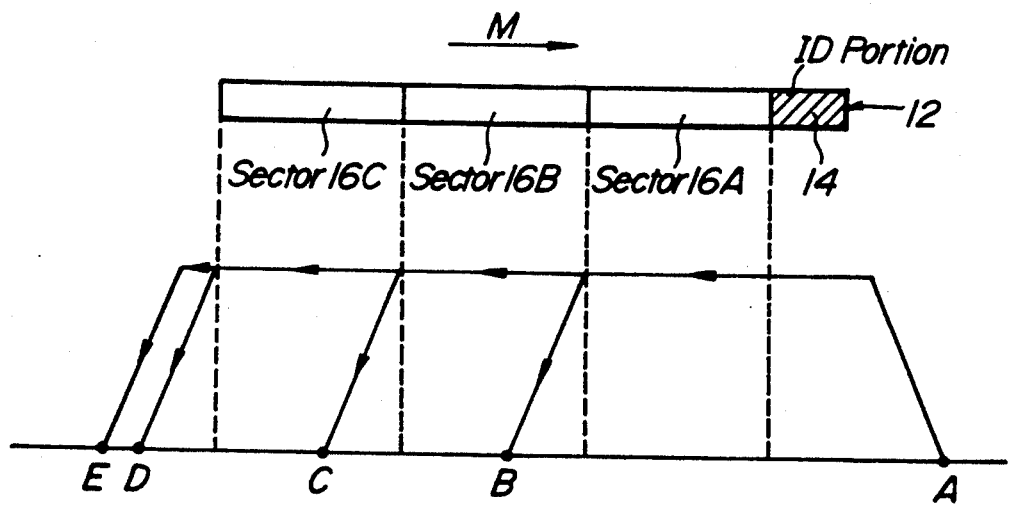
FIG_4

METHOD OF RECORDING DATA ON OPTICAL CARD BY PERFORMING BLANK CHECKING WITHOUT SCANNING AN ENTIRE TRACK

BACKGROUND OF THE INVENTION

Field of the Invention and Related Art Statement

The present invention relates to a method of recording data on an optical card.

Optical cards have a memory capacity of several hundreds to ten thousands times larger than the presently used magnetic cards and do not have rewritable capability like optical disks. However, because the optical cards have a large memory capacity of 1 to 2 M bytes, they promise a wide range of applications including bankbooks for banking, portable maps, prepaid shopping card, and the like.

The optical cards may be roughly classified into a first type of optical card in which a single ID portion including the track address is provided only at one end of each respective tracks (hereinafter abbreviated to a single-side ID optical card), and a second type of optical card in which two ID portions are provided at both ends of each respective tracks (hereinafter abbreviated to a double-side ID optical card). The first type of optical card is disclosed in, for instance, the Japanese Patent Laid-Open Publication Kokai Sho 63-37876.

In case of using such optical cards, generally, an optical card is moved in a track direction which is parallel to tracks to perform data recording, data reproduction, and ID portion reading. An access to a desired track is performed by a combination of a coarse access and a track jump. In the coarse access, an optical head with an objective lens is totally moved in a direction perpendicular to the track direction by utilizing a linear driving mechanism and is positioned into a desired track by detecting the position of the optical head with respect to the optical card by means of a position detecting means. In the track jump, the objective lens in the optical head is moved over tracks one by one by using a tracking driver. The tracking driver usually serves to move the objective lens such that the light beam can always follow tracks on the optical card.

FIG. 1 shows a configuration of the single-side ID optical card. The optical card 1 has a record area 3 in which a plurality of parallel tracks 2 are provided. Each of the tracks 2 includes an ID portion 4 provided at one end of the track and a data portion 5. In the ID portion 4 a track address signal has been pre-recorded such that the track address signal can be correctly read out when the optical card 1 is scanned by a reading light beam in a correct direction, i.e. from right to left in FIG. 1.

Now a known method of recording data onto the optical card shown in FIG. 1 will be explained with reference to a flow chart illustrated in FIG. 2. After the reading light beam having a lower power has been accessed to a desired track by performing the coarse access and track jump, the light beam is moved into one end point $S_1$ near the ID portion 4. Next, the optical card 1 is fed in the right hand direction in FIG. 1 to perform a blank check of the relevant track and the optical beam is positioned to the other end point $S_2$ of the optical card 1. The blank check may be performed by checking a change in the reflectance of the optical card or by detecting a presence of a high frequency component of the read out signal. As the result of this blank checking, when it is detected that a desired sector in the track is in an unwritten condition, the optical card 1 is fed in the left hand direction in FIG. 1 to move the light beam from the point $S_2$ to the point $S_1$. Next, the optical card 1 is moved again in the right hand direction, and when the light beam is made incident upon a start point of the desired sector, the power of the light beam is increased to a recording power and at the same time the light beam is modulated in accordance with a data signal to be recorded in the relevant sector.

However, the conventional data recording method using the single-side ID optical card has a disadvantage in that the access time is liable to be long, because each time the blank check is performed, the optical card 1 is moved from the, point $S_1$ to the point $S_2$, these points being situated at opposite ends of the track. That is to say, even if a desired blank sector is a first sector viewed in the scanning direction, the optical card has to be moved into the other end point $S_2$. It should be noted that in the double-side ID optical card, this could not be a disadvantage, because in this type of optical card, the data recording can be carried out in both moving directions of the optical card.

SUMMARY OF THE INVENTION

In order to overcome the prior problem, an object of the present invention is to provide a method of recording data onto single-side ID optical card wherein the blank check for detecting the recorded condition of a desired sector in a desired track can be performed within a short time, thus reducing an access time.

According to the invention, a method of recording data into a desired sector in a desired track on an optical card which comprises a plurality of tracks arranged in parallel with one another in a track direction, each track including an ID portion having a track address recorded therein and provided at one end of the track and a data portion which are divided into a plurality of sectors, comprising the steps of:

positioning a light beam onto a desired track which includes a desired sector in which the data is to be recorded;

checking whether said desired sector is in a written state or in an unwritten state, while said optical card and light beam are moved relative to each other in a forward direction in said track direction;

stopping the relative movement of the optical card and light beam immediately after said desired sector has been checked to be in the unwritten state;

moving the optical card and light beam relative to each other in a backward direction in the track direction;

moving the optical card and light beam relative to each other in the forward direction; and recording the data into s id desired sector while the light beam is scanning said desired sector.

In case of using an optical card in which a plurality of sectors are provided in a track without forming sector marks at boundaries between successive sectors, a start point of any desired sector can be detected by various ways. For instance, the start point of the desired blank sector may be detected by checking an envelope of the read out RF signal, by detecting a travelling distance or travelling time of the relative movement of the optical card and optical beam. In the latter case, it is necessary to know the length of the sectors and the travelling speed of the optical card. Further in case of using an optical card in which sector marks are recorded at start and end points of sectors in which the data has been recorded, the start point of the desired sector can be detected by detecting the sector marks. The positioning step for accessing the light beam onto the desired track may be effected by a combination of the coarse access and track jump. In this case the confirmation of the track address may be carried out during the blank check, so that the access time can be further shortened.

BRIEF DESCRIPTION OF THE DRAWINGS

FIG. 1 is a drawing showing a configuration of the known optical card for use in the known data recording method;

FIG. 2 is a flow chart for explaining the known recording method,;

FIG. 3 is a schematic plan view showing an embodiment of an optical card for use in the data recording method according to the present invention;

FIG. 4 is a diagram illustrating the process of the data recording methods according to the invention.

DETAILED DESCRIPTION OF THE INVENTION

Figure 5:
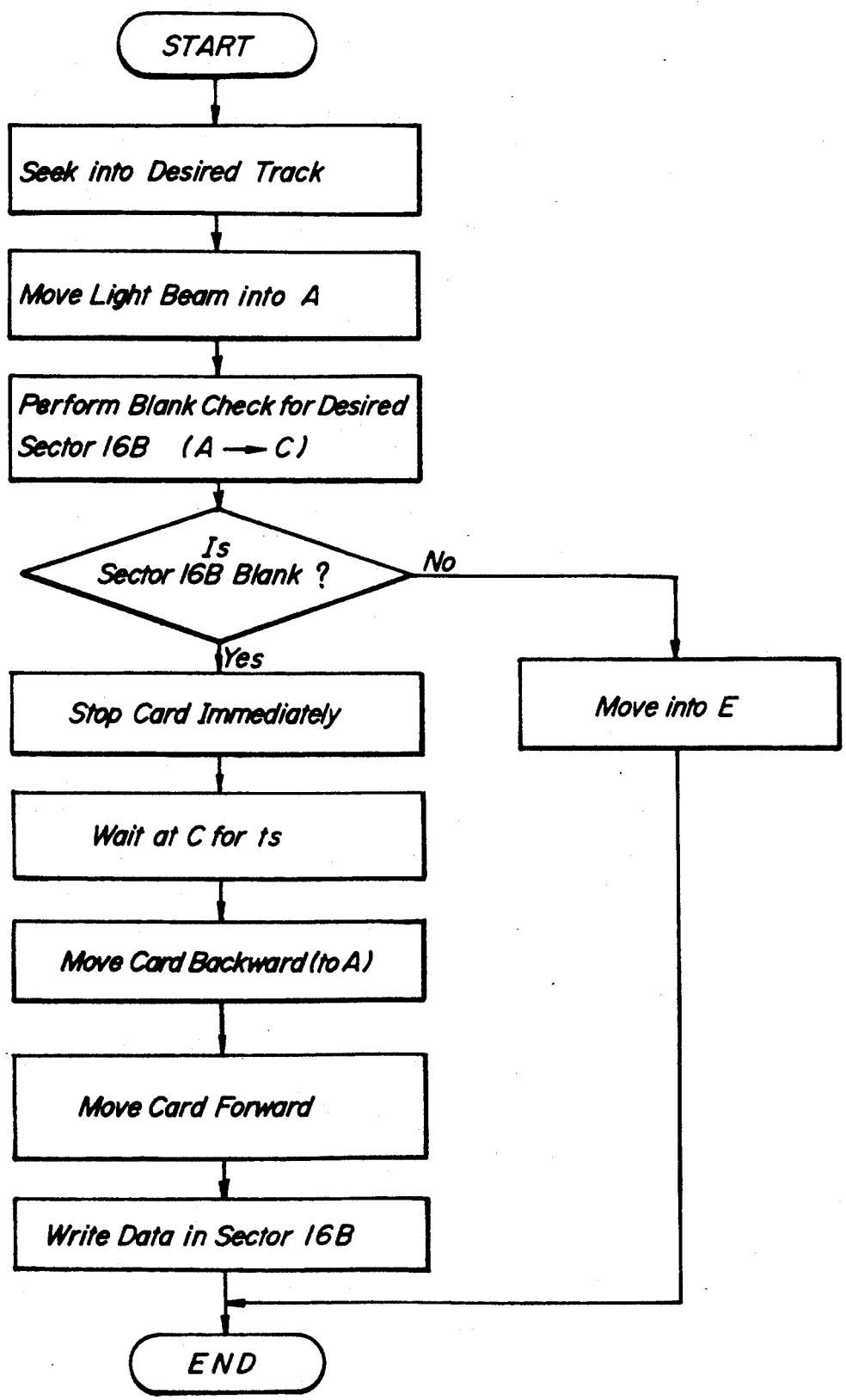
FIG. 5 is a flow chart for explaining successive steps of the data recording method according to the present invention.

FIG. 3 shows schematically a configuration of an optical card for use in the data recording method according to the present invention. The construction of an optical card 11 is substantially similar to that of the optical card shown in FIG. 1 and has a plurality of tracks 12 which are arranged in an optically recordable area 13 and are aligned along a longer side of the card in parallel with each other in a track direction. In FIG. 3 only a single track 12 is shown for the sake of clarity. The track includes an ID portion 14 provided at on one end of the track 12 and a data portion 15. In the ID portion 14 there has been previously recorded a track address information. The data portion 15 is divided into a plurality of sectors. In the present embodiment, these sectors are provided continuously without forming any sector marks therebetween. The data recording and reading operation is carried out by moving the optical card 11 in the right hand direction as shown by an arrow M in FIG. 3 with respect to an optical head including an objective lens.

Now a principal process of the data recording method according to the present invention will be explained by using a diagram illustrated in FIG. 4. In FIG. 4, the detailed construction of the track 12 is shown. A horizontal axis denotes a position of the light beam on the optical card 11 and a vertical axis represents a moving speed of the optical card with respect to the optical head. The track 12 includes three sectors 16A, 16B, and 16C without forming any gaps therebetween and data is recorded continuously into successive sectors. In FIG. 4, a point A represents a start point from which the scanning is initiated, and a point E denotes an end point of the scanning. In the blank checking, when the sectors are detected as being blank sectors, the optical card 11 is stopped at positions B, C and D, respectively.

Next, the data recording method according to this embodiment will be explained with reference to the flow chart shown in FIG. 5. In this embodiment, as mentioned above, the data recording and reproducing is performed by moving the optical card 11 with respect to the optical head in the track direction, and the access to a desired track is performed by the combination of the coarse access and the track jump. The coarse access is carried out by moving the whole optical head in the direction perpendicular to the track 12. The track jump is performed by moving the objective lens track by track by means of the tracking driver.

Now, in FIG. 4, it is assumed that data has been written in the first sector 16A, but data is not written in the second and third sectors 16B and 16C and new data is to be written in the vacant second sector 16B, so that the blank checking is effected for the second sector 16B.

First, the light beam is set to the lower reading power and is sought into a desired track. Then the light beam is positioned at the start point A in FIG. 4. Next, the blank checking is performed by moving the optical card in the track direction M. The ID portion 14 is read out to detect the track address of the relevant track and it is checked whether the relevant track is the desired one or not. Then, the envelope of the read out signal is detected to find blank sectors. In this embodiment, the envelope is obtained when the first sector 16A is scanned, but when the light spot comes into the start point of the second sector 16B, the envelope signal is lost, so that it is confirmed that the desired second sector 16B is vacant. As soon as the blank sector is detected, the optical card stopping operation is initiated and the optical card is stopped at the point B. Then, after a lapse of a short settling time ts, the optical card is moved in the backward direction such that the light beam is returned into the start point A.

Then, the optical card is moved again in the forward direction M. The track address recorded in the ID portion 14 is read out again, because there is a risk that the light beam might deviate from the desired track during the backward movement of the optical card. After confirming that the read-out track address is identical with that of the objective track, when the light spot comes to the start point of the second vacant sector 16B, the power of the optical beam is increased into the writing power and data is written into the sector 16B. The arrival of the light spot into the start point of the second sector 16B is detected by monitoring the envelope of the read out signal. This detection may be also carried out by detecting the position of the optical card with respect to the optical head or by detecting the time period of the movement of the optical card, provided that the length of a sector is known.

When it is confirmed that the second sector 16B is not blank, the optical card 11 is moved until the light spot reaches the end point E.

In comparison with the conventional blank checking method in which the optical card is moved from one end to the other end regardless of the position of the desired sector in the track, in the method according to the invention, since the movement of the optical card 11 is stopped immediately and is returned to the start point after confirming that the desired sector 16B is blank, the blank checking time can be reduced by a time which is twice the time necessary for moving the optical card from the point C to the point E. In an actual case, the time during which the optical beam scans the optical card from the point C to the point E is 45 ms, so that according to this embodiment, the access time can be reduced by about 90 ms every time the data is recorded.

In the above embodiment, the data is written onto the optical card without providing any gap between successive sectors. However, in the present invention it is also possible to use an optical card in which successive sectors are separated by sector marks. In this case, the start point of the sector can be detected by detecting the sector mark.

Further, the arrival of the light beam at the start point of the desired sector may be determined by detecting the distance of the movement of the optical card with respect to the optical head. This distance of the movement of the optical card may be detected by counting the output pulses generated by the rotary encoder coupled with the motor for feeding the optical card or by output pulses generated by a linear encoder provided on the shuttle on which the optical card is placed.

As mentioned above, in the data recording method according to the present invention, the blank checking can be performed without scanning the whole track, so that the blank checking can be effected within a short time and the access to the desired sector can be performed within a short access time.

What is claimed is:

1. A method of recording data into a desired sector in a desired track on an optical card which comprises a plurality of tracks arranged in parallel with one another in a track direction, each track including a single track ID portion having a track address recorded therein and provided at a first end of the track and a data portion which is divided into a plurality of sectors, said data portion being positioned between said ID portion and a second end of the track, comprising the steps of:
   (a) positioning a light beam onto a desired track which includes a desired sector in which the data is to be recorded;
   (b) after step (a), determining whether said desired sector is in a written state or in an unwritten state, while said optical card and said light beam undergo relative movement in a forward direction in said track direction;
   (c) stopping said relative movement of the optical card and the light beam immediately after said desired sector has been determined to be in the unwritten state such that said relative movement does not result in said light beam being positioned at said second end of said desired track;
   (d) thereafter causing the optical card and the light beam to undergo relative movement in a backward direction in the track direction;
   (e) after step (d), causing the optical card and the light beam to undergo relative movement in the forward direction; and
   (f) recording the data into said desired sector while the light beam is scanning said desired sector in step (e).

2. A data recording method according to claim 1, wherein step (b) is carried out by detecting an envelope of a read out signal from said desired track, while the light beam is set to a reading low power.

3. A data recording method according to claim 1, wherein step (b) is performed by detecting the variation of reflectance of the optical card.

4. A data recording method according to claim 1, wherein said positioning step is carried out by moving the light beam with respect to the optical card, and said relative movement of the optical card and light beam in steps (b), (d) and (e) is effected by moving the optical card with respect to the light beam.

5. A data recording method according to claim 4, wherein said positioning step is performed by a coarse access in which an optical head including an objective lens for projecting the light beam onto the optical card is moved in a direction perpendicular to the track direction and a track jump in which said objective lens of the optical head is moved in said direction perpendicular to the track direction.

6. A data recording method according to claim 4, wherein after the movement in step (b) of the optical card with respect to the light beam in the forward direction has stopped, the movement of the optical card in the backward direction in step (d) is initiated after a predetermined settling time has elapsed.

7. A data recording method according to claim 4, wherein when the optical card is moved with respect to the optical head in the forward direction, the track address recorded in the ID portion is read out and the read out track address is compared with a track address of the desired track.

8. A data recording method for recording data into a desired sector in a desired track on an optical card which comprises a plurality of tracks arranged in parallel with one another in a track direction, each track including a single track ID portion having a track address recorded therein and provided at a first end of the track and a data portion which is divided into a plurality of sectors, said data portion being positioned between said ID portion and a second end of the track, comprising the steps of:
   (a) positioning a light beam onto a desired track which includes a desired sector in which the data is to be recorded;
   (b) after step (a), determining whether said desired sector is in a written state or in an unwritten state, while said optical card and said light beam undergo relative movement in a forward direction in said track direction;
   (c) stopping said relative movement of the optical card and the light beam immediately after said desired sector has been determined to be in the unwritten state such that said relative movement does not result in said light beam being positioned at said second end of said desired track;
   (d) thereafter causing the optical card and the light beam to undergo relative movement in a backward direction in the track direction;
   (e) after step (d), causing the optical card and the light beam to undergo relative movement in the forward direction; and
   (f) recording the data into said desired sector while the light beam is scanning said desired sector in step (e), wherein said positioning step is carried out by moving the light beam with respect to the optical card, and said relative movement of the optical card and light beam in step (b), step (d) and step (e) is effected by moving the optical card with respect to the light beam, wherein when the optical card is moved with respect to the optical head in the forward direction, the track address recorded in the ID portion is read out and the read out track address is compared with a track address of the desired track and wherein in step (d) the optical card is moved in the backward direction into a start point on the track, and the track address recorded in the ID portion of the track is read out and the read out track address is compared with the track address of the desired track.

9. A data recording method according to claim 8, wherein said recording step is performed by changing the light beam into a recording high power when the light beam comes into a start point of the desired sector.

10. A data recording method according to claim 9, wherein the power of the light beam is changed into the recording high power when an envelope of a read out signal is lost.

11. A data recording method according to claim 9, wherein in step (e) a distance of the movement of the optical card with respect to the optical head is detected, and the power of the light beam is changed in the recording high power when a detected distance of the movement of the optical card becomes equal to a distance between the start point of the track to the start point of the desired sector.

12. A data recording method according to claim 9, wherein in step (e) a time during which the optical card is moved is detected, and the power of the light beam is changed into the recording high power when a time of the movement of the optical card becomes equal to a time necessary for the optical card moving from the start point of the track to the start point of the desired sector.

13. A data recording method according to claim 9, wherein in step (e) sector marks recorded at start and end points of sectors in which the data has been recorded are detected, and the power of the optical beam is changed into the recording high power upon detecting a sector, mark recorded at an end point of a sector which is located just before the desired sector.

* * * * *